(No Model.)  
2 Sheets—Sheet 1.
B. L. HARGROVE.
COTTON CHOPPER AND CULTIVATOR.
No. 591,116.  
Patented Oct. 5, 1897.
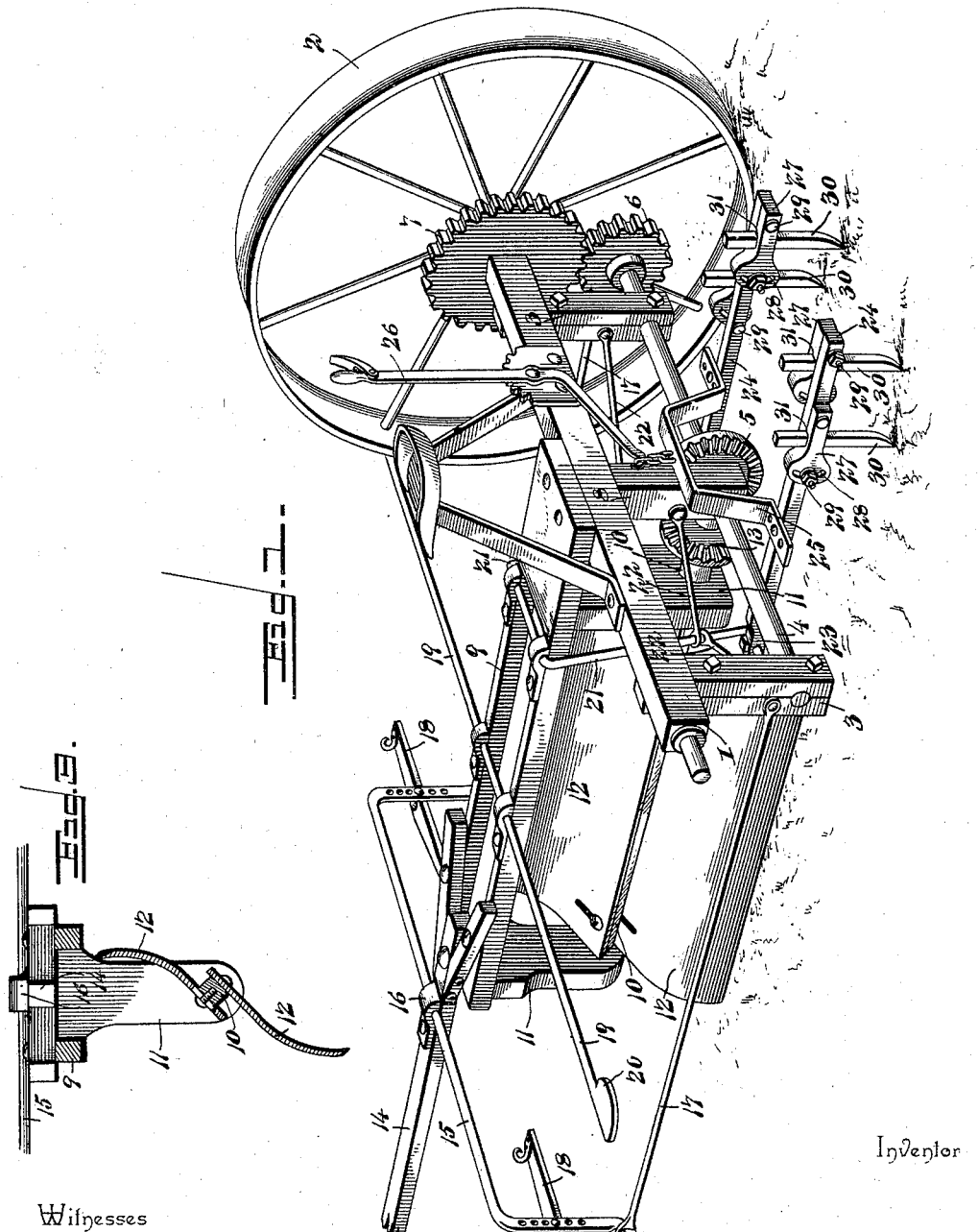
Witnesses  
E. N. Stewart  
U. B. Hillyard
Inventor  
Byron L. Hargrove  
By his Attorneys,  
C. A. Snow & Co.

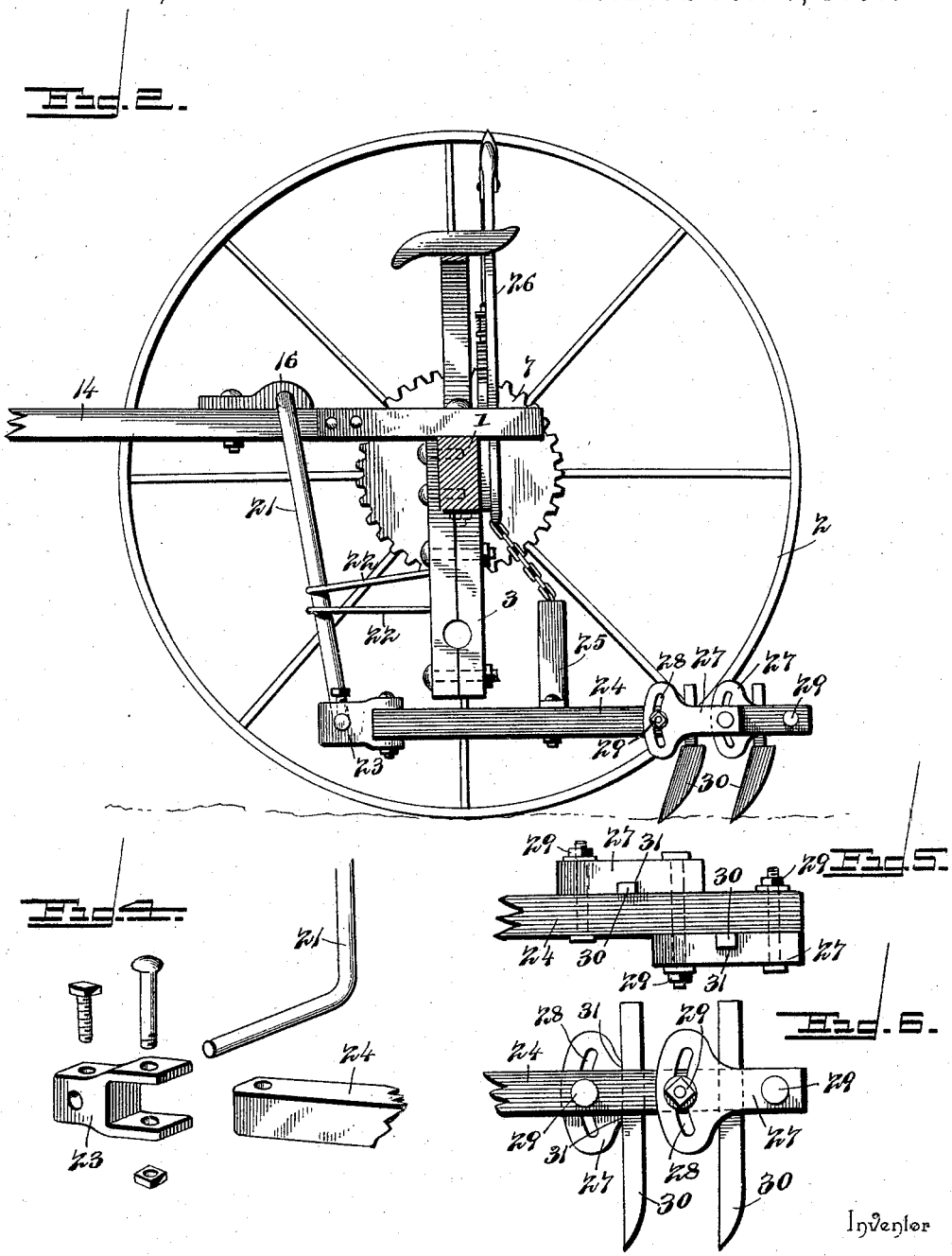

UNITED STATES PATENT OFFICE.

BYRON LAFAYETTE HARGROVE, OF McLENDONS, TEXAS.

COTTON CHOPPER AND CULTIVATOR.

SPECIFICATION forming part of Letters Patent No. 591,116, dated October 5, 1897.

Application filed November 24, 1896. Serial No. 613,306. (No model.)

*To all whom it may concern:*

Be it known that I, BYRON LAFAYETTE HARGROVE, a citizen of the United States, residing at McLendons, in the county of Rockwall and State of Texas, have invented a new and useful Cotton Chopper and Cultivator, of which the following is a specification.

This invention relates to agricultural implements or machines which are designed for simultaneously thinning rows of cotton-plants and plowing or cultivating, or for performing either work separately and independently, the machine being so constructed that when it is required to thin cotton-plants the chopping devices are in working position and the plowing or cultivating devices removed, and when it is required to plow or cultivate without thinning the hoeing or chopping devices are removed.

The improvement relates more particularly to the means whereby the hoeing and cultivating devices are secured in place, so as to be capable of being readily and quickly removed to adapt the machine for the particular work in hand.

For a full understanding of the merits and advantages of the invention, reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of the improved machine as it will appear when equipped for chopping or thinning the rows of plants and for plowing or cultivating, the front portion of the tongue being broken away and the ground-wheel on the near side removed. Fig. 2 is a longitudinal section showing the implement stripped of the hoeing or chopping mechanism and the accessories therefor. Fig. 3 is a transverse section of the casting and hoe or chopping blades. Fig. 4 is a detail view of the means for connecting a beam with the horizontal portion of the arched rod or bar. Fig. 5 is a top plan view of the rear end of a beam. Fig. 6 is a side elevation thereof.

Corresponding and like parts are referred to in the following description and indicated in the several views of the accompanying drawings by the same reference-characters.

The axle 1 is provided at its ends with ground-wheels 2, and near its ends with hangers 3, in which is journaled a shaft 4, provided intermediate of its ends with a bevel-gear 5, and at one end with a pinion 6, which is in mesh with a gear-wheel 7, secured to the adjacent ground-wheel in any convenient way, so as to revolve therewith. The hangers 3 are separable, so as to admit of the shaft 4 being removed when it is not required to use the hoeing or chopping mechanism in connection with the implement.

The detachable part of the hangers is bolted or otherwise fastened to the part of the hanger attached to the axle and is the rear portion, so as to admit of the shaft 4 being easily disconnected after the removable parts of the hangers have been displaced. An intermediate hanger 8 is detachably secured to the axle 1 and supports the shaft 4 about midway of its ends. A bracket-casting 9 is removably attached to the axle 1 and has a shaft 10 journaled in its pendent portions 11 and in the intermediate hanger 8, and this shaft has a square portion between the pendants 11, to which are adjustably secured hoe or chopping blades 12. A bevel-gear 13 is secured to the rear end of the shaft 10 and meshes with the bevel-gear 5 and is driven thereby. The tongue 14 is secured to the front end of the bracket-casting 9, and by lengthening or shortening the breast-straps the front end of the tongue can be raised or lowered, so as to cause the hoe or chopping blades to cut deep or shallow, as required. An arch 15 is secured to the tongue by means of a clip 16, and its bent or pendent ends are connected by rods 17 with the hangers 3, so as to strengthen the latter and apply the draft to the best advantage. The singletrees 18 have adjustable connection with the bent or pendent ends of the arch 15, so that the draft can be applied to the machine to the best possible advantage, according to the character of the work. A rod 19 is secured to the horizontal portion of the bracket-casting 9, and its ends are supplied with scrapers 20, so as to remove any earth, trash, or other matter from the treadsurfaces of the ground-wheels that may be clinging thereto.

An arched rod or bar 21 is secured to the rear portion of the bracket-casting, and its pendent portions are strengthened by braces 22, extending from the hangers 3 and 8 thereto, and the lower ends of the pendent parts of the arched rod or bar are bent outwardly and have blocks 23 adjustably mounted thereon and to which beams 24 are pivotally connected, so as to swing horizontally. Any suitable means may be employed for fastening the blocks 23 in an adjusted position, and, as shown, binding-screws are employed. A coupling rod or bar 25 adjustably connects the beams 24 and is arched intermediate of its ends, the terminal portions being bent horizontally and adapted to be secured to the beams 24 in any convenient way. This coupling rod or bar maintains the distance between the beams after the parts have been once adjusted.

Any convenient means may be employed for raising and lowering the beams, and, as shown, a lever 26 is mounted within convenient reach of the driver's seat and has connection with the coupling rod or bar 25, said lever being supplied with the ordinary hand-latch to engage with a notched segment for holding the beams at the required elevation.

A block 27, expanded at one end and contracted at the opposite end, has pivotal connection at the contracted end with a beam 24, and its expanded end is formed with an arcuate slot 28, through which operates a fastening-bolt 29 to secure the block in an adjusted position. This block is adapted to tilt to vary the pitch of the plow or cultivator 30 carried thereby, the standard of said plow or cultivator being seated in a groove or channel 31, formed in the inner side of the block intermediate of its ends, said standard being clamped in its seat by the fastenings employed for holding the block to the beam. Usually a block and a plow or cultivator shovel will be attached to opposite sides of a beam and the one will be placed in advance of the other.

The hoe or chopping blades 12 are rectangular-shaped plates curved intermediate of their inner and outer edges and have adjustable connection with the shaft 10, whereby provision is had for causing them to operate deep or shallow. To regulate the distance between the hills, the blades will be of suitable length, and where the hills are to be far apart the blades will be long, and for short distances apart the blades are proportionately shorter. Any suitable means may be employed for adjustably connecting the blades with the shaft, and, as shown, they are formed near their inner edges with transverse slots 32, through which pass the bolts or fastenings 33.

When the implement is to be used for hoeing or chopping and cultivating or plowing, it will appear, as shown most clearly in Fig. 1, with the chopping and plowing devices in position, but when it is to be used for either purpose solely the other mechanism is removed. When the machine is to be used for plowing only, the bracket-casting 9 is removed and the tongue 14 is secured directly to the axle 1 and the arched rod or bar 21 replaces the arch 15 and the shaft 4 and the intermediate hanger 8 are omitted, thereby making the machine as light as possible and comprising only such parts as are essential for plowing or cultivating. When the implement is required for chopping or thinning rows of plants without plowing or cultivating, the arched rod or bar 21, together with the plow-beams, and the arch 15, together with the rods 17, are removed.

The machine is equally well adapted for either plowing or cultivating or for thinning rows of plants, or will perform both operations at the same time and will give satisfactory results in either capacity, and when required for either work the mechanism and devices intended solely for the other work can be readily disconnected, thereby making provision for quickly stripping the machine of unnecessary parts.

Having thus described the invention, what is claimed as new is—

1. An agricultural implement of the character set forth for the purpose described, comprising an axle having ground-wheels, a shaft parallel with the axle and driven from a ground-wheel, a second shaft at right angles to the first shaft and driven therefrom, and bearing hoe or chopping blades, a bracket-casting having detachable connection with the axle and supporting the said second shaft, and an arched rod or bar having connection with the bracket-casting and bearing beams carrying plows or cultivators, substantially as set forth.

2. In an implement of the character set forth, the combination of an axle bearing ground-wheels and having hangers, a shaft journaled in the hangers and driven from a ground-wheel, a bracket-casting having detachable connection with the axle, a second shaft journaled at right angles to the first shaft in the pendent portions of the bracket-casting and bearing hoe or chopping blades, an arch, rods connecting the pendent ends of the arch with the end hangers of the axle, an arched rod or bar mounted upon the rear portion of the bracket-casting, braces connecting the pendent ends thereof with the hangers of the axle, and beams bearing plows or cultivating devices secured to the lower extremities of the said arched rod or bar, substantially as set forth.

3. In an agricultural implement of the character specified, the combination of an axle having ground-wheels at its ends, a middle and end hangers secured to the axle, the end hangers comprising separable parts, a shaft journaled in the hangers and driven from a ground-wheel, a bracket detachably connected with the axle, a shaft journaled in pendent portions of the bracket and in the middle hanger and receiving its motion from the first-mentioned shaft, hoe or chopping blades secured to the second shaft, and an arched rod or bar removably connected with the bracket-casting and having beams connected therewith bearing plows or cultivators, substantially as set forth.

4. An implement of the character specified, comprising an axle having ground-wheels, a shaft removably connected with the axle and driven from a ground-wheel, a bracket-casting detachably connected with the axle, a second shaft journaled in pendent portions of the bracket-casting and driven from the first-mentioned shaft, and bearing hoe-blades, a tongue adapted to be secured to either the bracket-casting or the axle, and an arched rod or bar adapted to be mounted upon either the bracket-casting or the tongue, and having connection therewith of beams bearing plows or cultivating devices, substantially as set forth.

5. In combination, a beam, a block having one end contracted and its opposite end expanded and provided with an arcuate slot, and having a seat intermediate of its ends in the side facing or adapted to be placed against the beam, a plow or cultivator having its shank fitted in the said seat, a fastening pivotally connecting the contracted end of the block with the beam, and a second fastening operating through the arcuate slot and serving to secure the block in an adjusted position, and both fastenings acting jointly to clamp the shank between the block and beam, substantially as set forth.

6. The herein-described implement, comprising an axle having ground-wheels and hangers, a shaft journaled in the hangers and driven from a ground-wheel, a bracket-casting having detachable connection with the axle, a second shaft journaled in the pendent portions of the bracket-casting and driven from the first-mentioned shaft, hoe or chopping blades having adjustable connection with the second shaft, an arched rod or bar secured to the rear portion of the bracket and braced from the hangers, beams having adjustable connection with the arched rod or bar and bearing plows or cultivating devices, an arch secured near the front end of the machine and having its bent end portions connected with the end hangers of the axle, and a rod bearing scraping-blades, substantially as and for the purpose set forth.

In testimony that I claim the foregoing as my own I have hereto affixed my signature in the presence of two witnesses.

BYRON LAFAYETTE HARGROVE.

Witnesses:
BISHOP COMPTON,
L. D. PEAY.